UNITED STATES PATENT OFFICE.

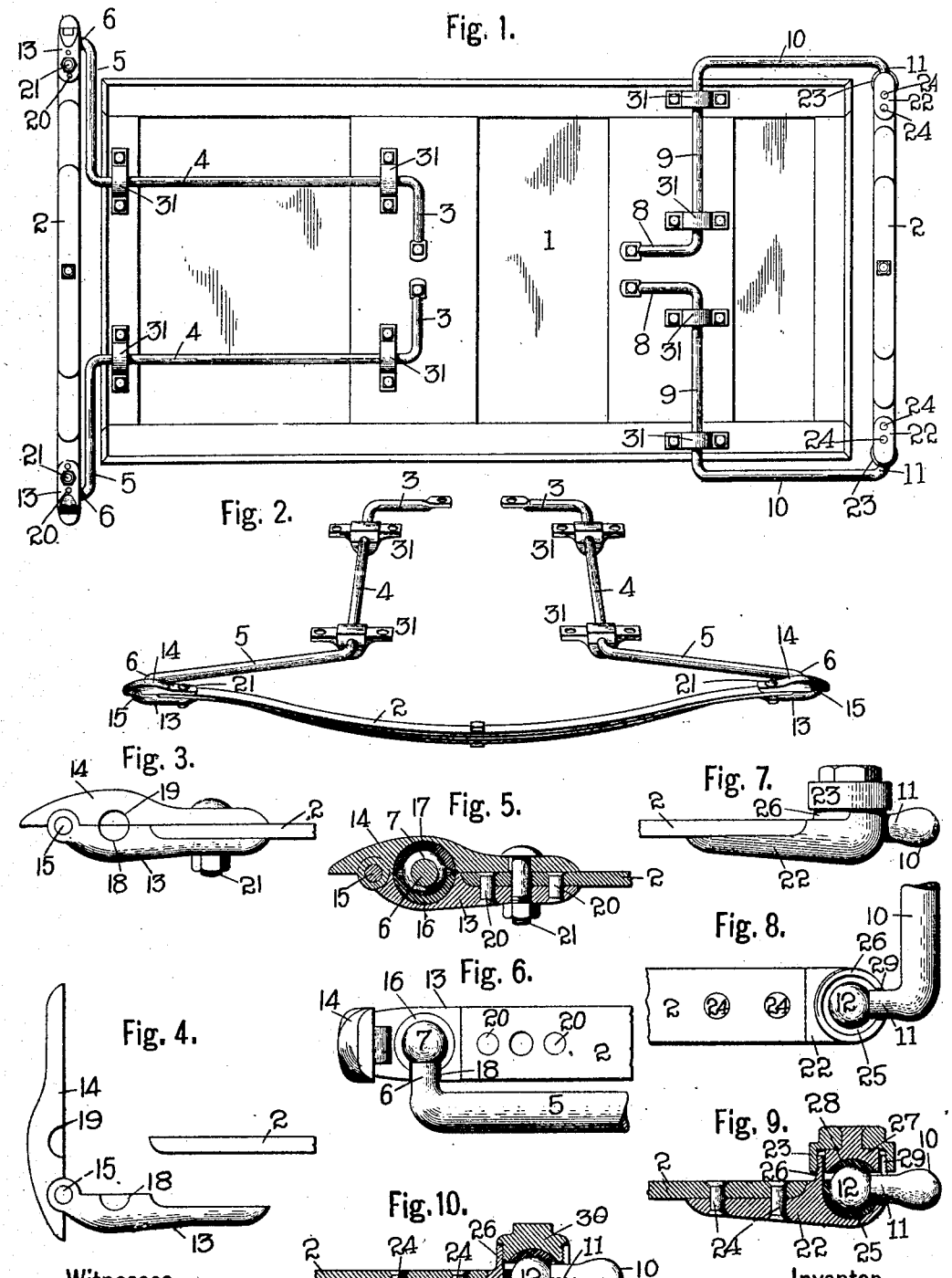

RICHARD MULHOLLAND, OF DUNKIRK, NEW YORK; OWEN B. MULHOLLAND, ADMINISTRATOR OF SAID RICHARD MULHOLLAND, DECEASED, ASSIGNOR TO THE MULHOLLAND COMPANY, OF DUNKIRK, NEW YORK.

VEHICLE-SPRING.

No. 913,668.        Specification of Letters Patent.        Patented Feb. 23, 1909.

Application filed January 12, 1907. Serial No. 351,971.

*To all whom it may concern:*

Be it known that I, RICHARD MULHOLLAND, a citizen of the United States, residing at Dunkirk, in the county of Chautauqua and State of New York, have invented a certain new and useful Improvement in Vehicle-Springs, of which the following is a specification.

This invention relates to improvements in vehicle springs and particularly to certain improvements in the couplings or connections for torsion and semi-elliptic vehicle springs, and the principal object is to provide a coupling which shall be strong enough in all its parts and its fastenings to resist any strain without bending or displacement.

The invention also relates to certain details of construction all of which will be fully and clearly hereinafter described and claimed, reference being had to the accompanying drawings, in which preferred adaptations of the invention are shown.

Figure 1 is an inverted plan view of a vehicle body provided with the improved springs. Fig. 2 is an enlarged perspective view of one form of the improved springs. Fig. 3 is an enlarged side elevation of one form of coupling attached to a fragment of a leaf spring and in its closed position. Fig. 4 is an enlarged side elevation of the form of coupling shown in Fig. 3, in its open position and detached from its connection to its supporting leaf spring, the fragment of the end of the leaf spring being shown removed from the coupling. Fig. 5 is a central vertical longitudinal section through the coupling shown in Figs. 3 and 4. Fig. 6 is a top plan view of the coupling shown in Figs. 3, 4 and 5 in open position with the ball seated in the socket. Fig. 7 is an enlarged side elevation of another form of coupling, attached to a fragment of a leaf spring. Fig. 8 is a top plan view of the coupling shown in Fig. 7, with the screw cap removed and the ball exposed. Fig. 9 is a central vertical longitudinal section through the coupling shown in Figs. 7 and 8. Fig. 10 is a central vertical longitudinal section through the coupling shown in Figs. 7, 8 and 9, with a different form of screw cap.

Referring to the drawing in detail, 1 represents the body of the vehicle, and 2, semi-elliptic springs which are arranged transversely of the body near each end thereof in the usual manner over the front and rear axles. The socket member of a ball coupling is attached to each end of the main leaf of each spring 2, by rivets or similar means.

The purpose in providing a separate socket member is to overcome the difficulty of forming it integral with the leaf spring and also to enable the locating of the socket members accurately and exactly in position. By forming the socket members separate from the springs they may be cast or forged accurately under a drop hammer so that they will be exact duplicates and the springs may all be made exactly the same length for a given size. This is a great advantage as with the socket members exact duplicates and the springs of exactly equal length when the socket members are fastened to the ends of the springs, each and every complete spring will be an exact and accurate duplicate of all other springs of the same size. Further the socket members may be made completely of suitable rigid and unyielding metal and the springs of suitable spring metal.

The semi-elliptic springs are yieldingly connected to the vehicle body by torsion springs, which are formed of suitable bars of spring metal bent into the desired shapes. The torsion springs are in pairs and are similar except in the direction of their bends. The torsion springs located near one end of the body consist of the short transverse inwardly extending portions 3, which are fastened rigidly to the body, the longitudinal torsional portions 4, extending forward and at substantially right angles from the outer ends of the portions 3, the transversely extending portions 5, which extend oppositely from each other and are located just beyond one end of the body see Fig. 1, and the short longitudinal portions 6, which are provided at their outer extremities with ball or similar enlargements 7. The torsion springs located near the opposite end of the body comprise the longitudinal inner portions 8, which are fastened rigidly to the body, the intermediate transverse torsional portions 9, which extend oppositely from each other from the ends of the portions 8, to and slightly beyond the sides of the body, the longitudinal portions 10, and the short inwardly extending transverse portions 11, which terminate in the ball or similar enlargements 12. It is obvious that for certain purposes either of these forms of torsion springs may be used in lieu of the other.

The form of torsion spring described first will hereinafter be termed for brevity, the longitudinal torsion springs, and the form of torsion spring described afterward will be hereinafter termed the transverse torsion springs.

It will be noted that the socket member employed in connection with one form of spring has an opening on its side while the other opens on its outer end.

The coupling shown in Figs. 3, 4 and 5, consists of two members 13 and 14, which are hinged or pivoted at one end by a pin 15, and are provided with semi-spherical depressions in which concavo-convex or cupped packings 16 and 17 of leather or other suitable material are fitted. Transverse grooves 18 and 19, extend out from the depressions through the sides of the members and, together, when the members are in closed position, form a circular opening. The member 13, is cut away to form a seat in which the end of the main or top leaf of the semi-elliptic spring is fitted and secured by rivets 20 or the like, see Fig. 5, to fasten the coupling to the end of the spring. The other member 14, when in closed position is fastened rigidly in place by a bolt 21 or other suitable fastening. This form of coupling is chiefly adapted to be used with the form of torsion spring having the ball ends 7, although with slight alteration they may be changed to serve with the other form of spring described.

The form of coupling shown in Figs. 7, 8 and 9, consists of a socket member 22, and a screw cap member 23. The socket member 22, is attached to the end of one of the spring leafs by rivets 24, and is provided near its outer end with a deep socket in which a packing 25, of leather or other suitable material is fitted. A short tubular flange 26, extends laterally from the margin of the metal surrounding the socket which is screw threaded on its outer surface. The screw cap 23, screws upon the flange 26, and has a block 27, fitted within and provided with a shallow recess in its bottom surface in which a packing 28 of leather or the like is fitted. The wall of the socket member is slotted deeply at its outer end as shown at 29 in Figs. 8 and 9, to provide an opening for the reception of the arm 11, when the ball 12, is fitted in the socket member. It is obvious that this slot may be located on the side instead of the end to enable the use of this form of socket with the second form of torsion spring described.

In Fig. 10, a screw plug 30, is shown which may be utilized in place of the screw cap, the interior of the flange being screw threaded and the packing being fitted in the lower end of the plug.

The leather packing which is preferably employed in all the couplings is coated with graphite or other suitable lubricant.

The torsion springs are fastened at suitable points to the vehicle body by metallic clamps 31.

The transverse torsion springs are best adapted to be used for bodies having the semi-elliptic springs located at a considerable distance from the end of the body, owing to the fact that this style of torsion springs can be attached close up to the longitudinal portions 10, of the springs which are widely separated and extend close along the sides of the body to its connection with the ends of the semi-elliptic springs. By this means the strain upon the torsion portions of the springs is of a torsional nature only and all tendency to bend or break the torsional portions is obviated.

The longitudinal torsion springs are best adapted where the end of the body comes close to the semi-elliptic spring so that the torsional portions do not project sufficiently to permit a bending strain on the said portions.

I claim as my invention—

1. In a device of the class described, the combination with a torsion spring of a leaf spring, a multi-part socket device formed separate from the springs having one part attached to an end of a leaf spring and another part positively hinged at one end to said first mentioned part, whereby said part may be swung open to an appreciable extent without detaching it; said device having a socket in which a torsion spring is supported and means for rigidly and unbendably fastening the ends of said parts opposite the hinge in closed position.

2. In a device of the class described, the combination with torsion springs provided with enlarged ends, of a leaf spring, a socket device in a plurality of parts having one part attached to an end of the leaf spring and another part hinged at one end to said first mentioned part and said device having a socket to receive the enlarged end of a torsion spring, and means for rigidly and unbendably fastening the ends of said parts opposite the hinge in closed position.

3. In a device of the class described, the combination with torsion springs provided with enlarged ends of leaf springs, and separate socket devices attached to the ends of the leaf springs in which the enlarged ends of the torsion springs are rotatably supported; one of said socket devices embodying two members hinged together at one end and bolted together at the other end to absolutely prevent bending under strain.

4. In a device of the class described, the combination with torsion springs provided with enlarged ends, of leaf springs, and separate socket devices attached to the ends of the leaf springs; one of said socket devices embodying a member fastened to a leaf spring and having a socket in which the enlarged end of a torsion spring engages, and a screw member for closing the open end of the socket.

5. In a device of the class described, the combination with torsion springs provided with enlarged ends of leaf springs, and separate socket devices attached to the ends of the leaf springs; one of said socket devices embodying a member fastened to a leaf spring and having a socket in which the enlarged end of a torsion spring engages, and a circular flange extending laterally from the margin of the socket, and a screw member for closing the open end of the socket.

6. In a device of the class described, the combination with torsion springs provided with enlarged ends of leaf springs, and separate socket devices attached to the ends of the leaf springs; one of said socket devices embodying a member fastened to a leaf spring and having a socket in which the enlarged end of a torsion spring engages, and a circular screw threaded flange extending laterally from the margin of the socket, and a screw member engaging the screw threaded flange for closing the open end of the socket.

7. In combination a plurality of springs and means for coupling two of said springs including a multi-member hinge device formed separate from the springs; one of the members of which is fastened rigidly to one of the springs and another member of which is positively hinged at one end to the first mentioned member and is adapted to be completely opened without detachment from said first mentioned member and to be bolted at the opposite end to said first mentioned member and said hinge device having a socket between said hinge and bolt in which a projecting part of another spring is adapted to be rotatably secured.

8. In a combination a semi-elliptic spring, a torsion spring and means for coupling said springs including a hinge device, one of the members of which is fastened rigidly to the semi-elliptic spring and another member of which is hinged at one end to the first mentioned member and is adapted to be bolted at the opposite end to said first mentioned member and said device having a socket between said hinge and bolt in which a projecting part of the torsion spring is adapted to be secured.

9. In combination two pairs of torsion springs secured at opposite ends of a vehicle body and one pair having transversely extending ends provided with ball enlargements and the other pair having longitudinally extending ends with ball enlargements, semi-elliptic springs located near each end of the body, and socket couplings at the ends of the semi-elliptic springs, one of said socket couplings embodying two hinged together members each having semi-circular recesses and grooves extending from the recesses to the outer side of the members and another of said couplings embodying a socket member and a screw cap.

10. In combination two pairs of torsion springs secured at opposite ends of a vehicle body and one pair having transversely extending ends provided with ball enlargements and the other pair having longitudinally extending ends with ball enlargements, semi-elliptic springs located near each end of the body, and socket couplings at the ends of the semi-elliptic springs, one of said socket couplings embodying two hinged together members each having semi-circular recesses and grooves extending from the recesses to the outer side of the members and another of said couplings embodying a socket member having a socket and a slot extending from the socket through the end wall of the member and a screw cap.

RICHARD MULHOLLAND.

Witnesses:
L. M. SANGSTER,
GEORGE A. NEUBAUER.